United States Patent Office 2,769,338
Patented Nov. 6, 1956

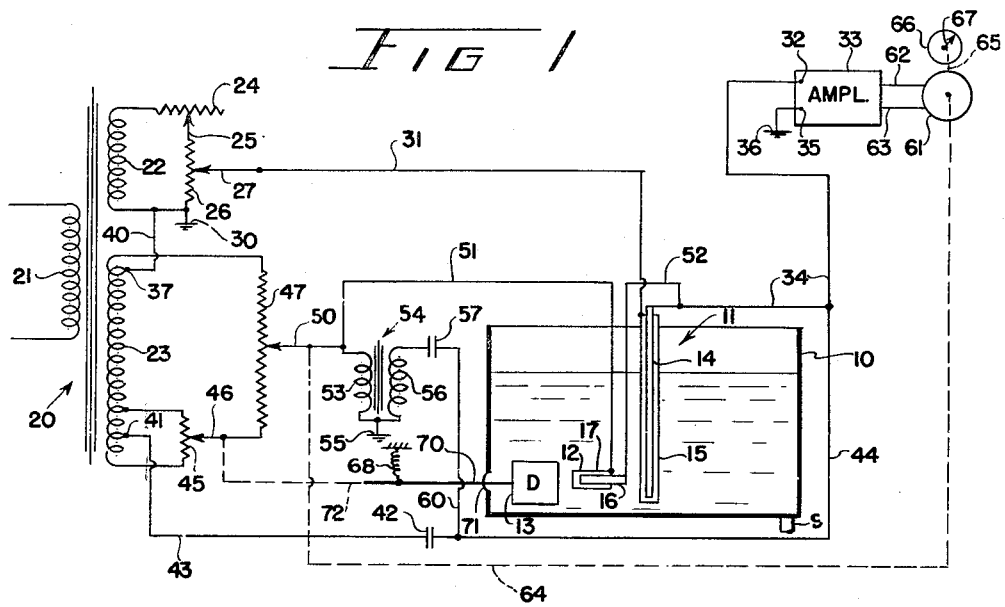
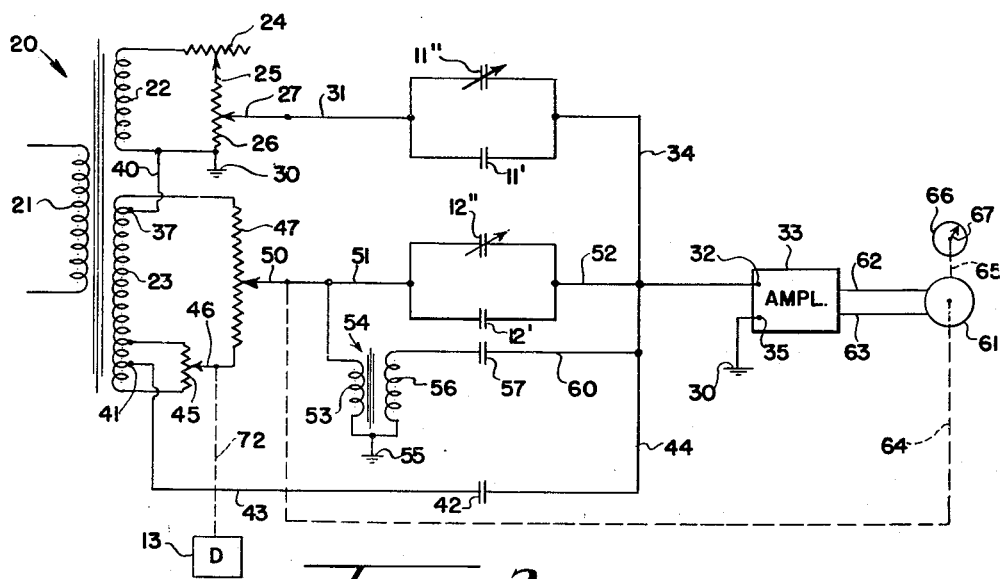

2,769,338

FUEL GAGE APPARATUS

Harry M. Hermanson, Golden Valley, Minn., assignor to Minneapolis-Honeywell Regulator Company, Minneapolis, Minn., a corporation of Delaware Application January 4, 1952, Serial No. 265,010

8 Claims. (Cl. 73—304)

This invention is concerned generally with fuel quantity measuring apparatus and more particularly with fuel quantity measuring apparatus using a capacitive type pickup as the sensing element. It is therefore an object of this invention to design a new and improved fuel quantity measuring apparatus using a capacitive sensing element.

The aircraft industry has come to rely more and more upon capacitive type sensing elements for measuring the quantity of fuel in the planes because of their high degree of accuracy. The capacitive type of sensing element is not affected by foaming of the fuel and in addition the sensing element has no moving parts which might cause error through wear. A capacitive pickup is, of course, affected by the dielectric constant of the material between the plates. In fact, this is the principle upon which the capacitive type of fuel measuring apparatus operates. Since the dielectric constant of the fuel used in aircraft is approximately twice that of air the capacitance of the pickup varies substantially with rise and fall of fuel in the gas tank.

It is desirable to measure the weight of the fuel rather than its volume since the power produced by an aircraft engine is determined by the pounds, rather than by the gallons, of fuel which it consumes. Therefore, the more accurate the measurement of the weight of fuel is, the smaller the quantity of excess fuel which need be carried for a safety margin.

Changes in dielectric constant and density of aircraft fuel are fairly closely correlated. This has allowed fuel quantity indication in pounds of fuel even though the indicator movement is controlled by the dielectric constant. Some error results due to lack of complete correlation unless some form of compensation is utilized.

Now, if the change in dielectric constant factor is completely compensated for, the apparatus would measure the height of the fuel in the tank with a very high degree of accuracy. If the shape of the fuel tank is known the capacitance of the capacitive sensing element, or tank unit, may provide an indication of the volume of the fuel in the tank, either by proper location of several tank units or by varying the effective area of the plates of a single tank unit along its length with change in the cross-sectional area of the tank with change in depth. Then, if a density indication were to be added to the apparatus so that the volume indication is multiplied by the density indication, the resultant indication would be one of weight, or B. t. u. content, of the measured quantity of fuel.

It is therefore a further object of this invention to provide a fuel quantity measuring apparatus which measures the weight of fuel with a high degree of accuracy.

A further object of the invention is to provide a capacitive type of fuel quantity measuring apparatus in which changes in the dielectric constant of the fuel are completely compensated for.

Another object of the invention is to provide a capacitive type of fuel quantity measuring apparatus which is capable of measuring the height of the fuel with a high degree of accuracy.

A further object of the invention is to provide a capacitive type of fuel quantity measuring apparatus in which a compensator tank unit completely eliminates the the effect of change in the dielectric constant of the fuel from the apparatus.

A still further object of the invention is to provide a capacitive type of fuel quantity measuring apparatus in which the effect of the minimum capacitance of the compensator tank unit, which would be its capacitance in air, is completely eliminated.

A further object of the invention is to provide a capacitive type of fuel quantity measuring apparatus in which the effect of the minimum capacitance of the compensator tank unit is completely eliminated by the effect of a fixed capacitor, the voltage across which varies linearly with the voltage across the compenstor tank unit.

Briefly, the apparatus of the invention consists of a measuring tank unit connected to a fixed source of voltage; a first fixed capacitor which may be called a measuring empty tank capacitor, also connected to a fixed source of voltage of opposite phase to the voltage across the measuring tank unit; a compensator tank unit connected to a variable source of voltage of opposite phase to the voltage across the measuring tank unit; and a second fixed capacitor which may be called a compensator empty tank capacitor connected to the same variable source of voltage as the compensator tank unit, but through a phase reversing transformer. The effect of the first fixed capacitor, or measuring empty tank capacitor, is to eliminate the effect of the empty tank capacitance value of the measuring tank unit while the effect of the second fixed capacitor, or compensator empty tank capacitor, is to eliminate the effect of the minimum capacitance value of the compensator tank unit, which would be its capacitance in air. The remaining effect of the measuring tank unit is then due to the height of the fuel in the tank and the dielectric constant of that fuel. The compensator tank unit has remaining an effect due solely to the dielectric constant of the fuel which nullifies the effect of a change in dielectric constant so that the measuring tank provides in effect indicative of only the height of the fuel in the tank and is uneffected by the dielectric constant of the fuel except in so far as the fuel dielectric constant must differ from that of the air above the fuel. A density indication is put into the apparatus to affect the height indication and produce a weight indication which is then read off a dial.

For a more complete understanding of the invention reference is had to the following detailed description and the accompanying drawings in which Figure 1 is a diagrammatic circuit drawing showing the invention; and Figure 2 is a circuit drawing showing electrical equivalents of certain components in the circuit of Figure 1.

In the circuit of Figure 1 a tank 10 is shown to have within it a measuring tank unit capacitor 11, a compensator tank unit capacitor 12 and a density measuring device 13. Measuring tank unit 11 has an inner electrode 14 and an outer electrode 15 while compensator tank unit 12 has an inner electrode 16 and an outer electrode 17.

The measuring tank unit 11 is vertical in the fuel tank 10 so that the fuel in the tank covers a certain portion of the plates, depending upon the height of the fuel in the tank. Since fuel has a dielectric constant of approximately twice that of air, the capacitance of the measuring tank unit 11 varies with rise and fall of the fuel in the tank. Thus, when the tank is full the capacitance of the measuring tank unit 11 is approximately twice its capacitance when the tank 10 is empty.

Compensator tank unit 12 is placed horizontally in the tank near the bottom of the tank so that it is completely immersed in fuel at all times except when the tank is almost empty.

Tank units 11 and 12 are connected into a circuit energized by a transformer 20 having a primary 21 and secondaries 22 and 23. A rheostat 24 having a wiper arm 25 has one terminal thereof connected to one terminal of transformer secondary 22. A potentiometer 26 having a wiper arm 27 is connected between the wiper arm 25 of rheostat 24 and the lower terminal of transformer secondary 22. The lower end of potentiometer 26 is further connected to ground terminal 30.

The wiper arm 27 of potentiometer 26 is connected to the outer electrode 15 of measuring tank unit 11 through conductor 31. The inner electrode 14 of measuring tank unit 11 is connected to input terminal 32 of amplifier 33 through conductor 34. The second input terminal 35 of amplifier 33 is connected to ground terminal 36.

Transformer secondary 23 is connected near its upper end at a terminal 37 to ground terminal 30 through conductor 40. Near its lower end transformer secondary 23 has a terminal 41 connected to a first plate of a capacitor 42 through conductor 43. Capacitor 42 is the measuring empty tank capacitor above mentioned. The other plate of capacitor 42 is connected to input terminal 32 of amplifier 33 through conductors 44 and 34.

A potentiometer 45 having a wiper arm 46 is connected across the lower portion of transformer secondary 23.

A potentiometer 47 having a wiper arm 50 is connected between the upper terminal of transformer secondary 23 and wiper arm 46 of potentiometer 45. Potentiometer 47 is a rebalancing potentiometer while potentiometer 45 may be considered a density correction potentiometer.

Capacitor 42, the measuring empty tank capacitor, is for the purpose of balancing out of the measuring circuit the minimum signal for measuring tank unit 11 which would be due to an empty tank of fuel. Thus, the remaining sinal for measuring tank unit 11 is due to the height of the fuel in the tank and the dielectric constant of the fuel.

The outer electrode 17 of compensator tank unit 12 is connected to wiper arm 50 of potentiometer 47 through conductor 51. The inner electrode 16 of compensator tank unit 17 is connected to input terminal 32 of amplifier 33 through conductors 52 and 34.

Also connected to wiper arm 50 of potentiometer 47 is one terminal of a primary 53 of a transformer 54. The other terminal of transformer primary 53 is connected to ground terminal 55. One terminal of transformer secondary 56 of transformer 54 is also connected to ground terminal 55. The other terminal of transformer secondary 56 is connected to one plate of a capacitor 57. Capacitor 57 is the compensator empty tank capacitor above mentioned The other plate of capacitor 57 is connected to input terminal 32 of amplifier 33 through conductor 60 and 44. It is seen that the voltages across the compensator unit 12 and the capacitor 57 are both dependent upon the voltage between wiper arm 50 and ground. The compensator unit is connected directly to wiper arm 50 while the magnitude of the voltage across transformer secondary 56, to which capacitor 57 is connected, is dependent upon the magnitude of the voltage across the primary 53, which is connected to the wiper arm 50.

Transformer 54 acts as a phase reversing device to put a voltage across capacitor 57 of the opposite phase of the voltage across compensator tank unit 12. The signal from capacitor 57, the compensator empty tank capacitor, is equal to and opposite the signal from compensator tank unit 12 which would exist when there is no fuel between the electrodes, or in other words, with air as dielectric. The signal from compensator tank unit 12 with the tank unit immersed in fuel changes due to the dielectric constant of the fuel being different from that of air. If it is now assumed that the dielectric constant of the fuel changes, the signal from tank unit 12 changes and this signal change is equal and opposite, through proper construction of the various components, to the change in the signal from measuring tank unit 11 due to the assumed change of dielectric constant of the fuel. The compensator tank unit 12, in responding to changes in the dielectric constant of the fuel, produces a signal indicative of the dielectric constant of the fuel. As a result, the only effective signal which remains in this circuit is the signal from measuring tank unit 11 which is due to the height of the fuel in the tank. This signal is not indicative of the dielectric constant of the fuel except for the requirement that the fuel dielectric constant differ from that of the air above that fuel. If the electrode area of measuring tank unit 11 were to be so dimensioned that the change in capacitance of measuring tank unit 11 with rise and fall of fuel in tank 10 were to vary linearly with change in the volume of the fuel in the tank the signal into amplifier 33 would then be an indication of the volume of fuel in the tank. Also, it would be possible to use several tank units strategically positioned in order that the change in capacitance of all these tank units together would vary linearly with change in volume of the fuel rising and falling in the tank.

A motor 61 is connected to amplifier 33 through conductors 62 and 63 for energization and consequent reversible rotation of motor 61 with selective energization of amplifier 33. The amplifier is of the type which is capable of receiving an input signal of either a first or a second phase to produce an output signal of either a first or a second phase. The motor 61 is of the type which is capable of rotating in a first or a second direction depending upon the phase of the input signal. The amplifier and motor combination may be such as is described and claimed in the Upton Patent 2,423,534 assigned to the same assignee as the present invention. Motor 61 is connected to wiper arm 50 of potentiometer 47 through a mechanical connection 64 for rebalancing purposes.

Thus, when a signal voltage exists upon the input terminals 32 and 35 of amplifier 33 motor 61 rotates to move wiper arm 50 along potentiometer 47 until that signal voltage is wiped out. At this time, the motor 61 then comes to rest.

Also mechanically connected to motor 61 by mechanical connection 65 is an indicator dial 66 having a pointer 67 for indicating the amount of fuel in the tank 10.

The manner in which the various capacities are cancelled out may perhaps be seen better by reference to Figure 2. Like components have been designated with like numerals. Tank units 11 and 12 have been schematically broken down into their fixed and variable components with the fixed components being designated as 11' and 12' for the measuring tank unit and compensator tank unit respectively while the variable portions of the capacitors have been designated as 11" and 12" respectively.

With the tank 10 empty, and thus no fuel between the electrodes of tank units 11 and 12, the wiper arm 25 of rheostat 24 and wiper arm 27 of potentiometer 26 are varied until the signal from the fixed capacitance of tank unit 11, designated as 11', is equal to the signal from capacitor 42. By design, the signal from capacitor 57 is made equal to the signal from the fixed capacitance of compensator tank unit 12 designated as 12'. Since the voltage across capacitor 57 goes through the phase reversal transformer 54, the signal from capacitor 57 opposes and nullifies the signal from tank unit portion 12'. Since voltages of opposite phase are placed across capacitor 42 and tank unit portion 11', the signals from these two components are also nullified. Thus, all that remains is the signal from measuring tank unit portion 11" and from compensator tank unit portion 12". These two signals are both affected by the dielectric constant of the fuel. Since the signal from each of these two components is affected equally but oppositely by the dielectric constant of the fuel, the effect of the dielectric constant is then eliminated from the circuit, except for the requirement that the fuel dielectric constant differ from that of the air above the fuel, and all that remains is the height indication, or, if the change in capacity throughout the measuring tank unit varies linearly with change in the volume of the fuel with rise and fall of the fuel, the indication is the volume of the fuel.

The apparatus described up to now provides merely a height, or volume, indication of the fuel in the tank.

A density indication is put into the circuit by density measuring device 13, which is shown to be a float of lighter density than the fluid and which exerts a force against a spring 68. It is noted that the float always remains submerged. As shown in the circuit of Figure 1, the float 13 has a mechanical extension 70 which passes through a diaphragm 71 in the wall of tank 10. This mechanical extension is extended through mechanical connection 72 to wiper arm 46 of potentiometer 45 to move the wiper arm 46 with rise and fall of the float 13. The float 13 has a buoyancy depending upon the density of the surrounding fluid. When the density of the fluid increases the buoyancy becomes greater and exerts a greater force upon the spring 68 until the spring has been expanded until its force equals the buoyancy force of the float. With decreased density the buoyancy of the float decreases and the float sinks. Thus, a change in the density of the fuel in the tank varies the float position and changes the voltage across potentiometer 47 and so changes the signal due to potentiometer 47 and compensator tank unit 12.

If the density of the fuel decreases the float 13 moves downwardly in the tank and moves wiper arm 46 downwardly along potentiometer 45 to increase the voltage across potentiometer 47. Thus, if the signal from measuring tank unit 11 were to remain the same while the fuel decreases in density, wiper arm 50 would move upwardly along potentiometer 47 to place a smaller voltage across compensator tank unit 12 to balance out the signal from measuring tank unit 11. This would result in the needle 67 on indicator dial 66 indicating a smaller weight of fuel in the tank for the fuel of decreased density.

Conversely, if the density of the fuel in the tank 10 were to increase float 13 would rise, moving wiper arm 46 upwardly along potentiometer 45 to place a smaller voltage across potentiometer 47. This would mean that wiper arm 50 would have to move downwardly along potentiometer 47 to neutralize a signal from measuring tank unit 11 which remained at the same magnitude as before.

It is thus seen that an accurate weight measuring fuel gage apparatus has been designed which eliminates the effects of the dielectric constant of the fuel while at the same time retaining all the benefits of the capacitive type sensing element fuel measuring apparatus.

Because various modifications may be made by those skilled in the art within the spirit of the invention it is intended that the scope of the invention be limited only to the extent of the appended claims.

I claim as my invention:

1. Fluid quantity measuring apparatus comprising in combination: a source of voltage; fluid quantity measuring capacitive means connected across a portion of said voltage source and inserted in a container of fluid and providing a signal indicative of the height and dielectric constant of the fluid; compensator capacitive means variably connected across a portion of said voltage source and inserted in the container of fluid and providing a signal opposite to the signal from said measuring capacitive means and of a magnitude indicative of the dielectric constant of the fluid; density responsive means; means variably connecting said density responsive means to said voltage source and controlling the potential of the portion of the voltage source across which said compensator capacitive means is connected; and means adding the two signals together and providing an indication of the weight of the fluid in the container.

2. Fluid quantity measuring apparatus comprising in combination: a source of voltage; measuring capacitive means connected across a portion of said voltage source and inserted in a container of fluid and providing a signal indicative of the height and dielectric constant of the fluid; compensator capacitive means variably connected across a portion of said voltage source and inserted in the container of fluid and providing a signal opposite to the signal from said measuring capacitive means and of a magnitude indicative of the dielectric constant of the fluid; density responsive means; means variably connecting said density responsive means to said voltage source and controlling the potential of the portion of the voltage source across which said compensator capacitive means is connected; and indicating and rebalancing means connected to said two capacitive means and adding the two signals together and providing an indication of the weight of the fluid in the container, said indicating and rebalancing means being connected to and adjusting the variable connection of said compensator capacitive means across the portion of said voltage source and changing the signal from said compensator capacitive means upon the resultant signal not being zero such that the change of signal from said compensator capacitive means becomes equal to the change of signal from said measuring capacitive means due to change in height of the fluid and reduces the sum of the two signals to zero.

3. Fluid quantity measuring apparatus comprising in combination: a source of voltage; measuring capacitive means connected across a portion of said voltage source and inserted in a container of fluid and providing a signal indicative of the height and dielectric constant of the fluid; measuring empty container capacitive means connected across a portion of said voltage source and providing a signal equal and opposite to the portion of the signal from said measuring capacitive means indicative of no fluid in the container; compensator capacitive means variably connected across a further portion of said voltage source and inserted in the container of fluid and providing a signal opposite to the signal from said measuring capacitive means and of a magnitude indicative of the dielectric constant of the fluid; compensator empty container capacitive means, means including said compensator empty container capacitive means variably connected across said further portion of said voltage source and providing a signal equal and opposite to the portion of the signal from said compensator capacitive means indicative of no fluid in the container; density responsive means; means variably connecting said density responsive means to said voltage source and controlling the potential of said further portion of the voltage source across which said compensator and said compensator empty container capacitive means are connected; and means adding the four signals together and providing an indication of the weight of the fluid in the container.

4. Fluid quantity measuring apparatus comprising in combination: a source of voltage; measuring capacitive means connected across a portion of said voltage source and inserted in a container of fluid and providing a signal indicative of the height and dielectric constant of the fluid; measuring empty container capacitive means connected across a portion of said voltage source and providing a signal equal and opposite to the portion of the signal from said measuring capacitive means indicative of no fluid in the container; compensator capacitive means variably connected across a further portion of said voltage source and inserted in the container of fluid and providing a signal opposite to the signal from said measuring capacitive means and of a magnitude indicative of the dielectric constant of the fluid; phase reversing means, compensator empty container capacitive means variably connected across said further portion of said voltage source through said phase reversing means and providing a signal equal and opposite to the portion of the signal from said compensator capacitive means indicative of no fluid in the container; density responsive means; means variably connecting said density responsive means to said voltage source and controlling the potential of said further portion of the voltage source across which said compensator and said compensator empty container capacitive means are connected; and means adding the four signals together and providing an indication of the weight of the fluid in the container.

5. Fluid quantity measuring apparatus comprising in combination: a source of voltage; measuring capacitive means connected across a portion of said voltage source and inserted in a container of fluid and providing a signal indicative of the height and dielectric constant of the fluid; measuring empty container capacitive means connected across a portion of said voltage source and providing a signal equal and opposite to the portion of the signal from said measuring capacitive means indicative of no fluid in the container; compensator capacitive means variably connected across a portion of said voltage source and inserted in the container of fluid and providing a signal opposite to the signal from said measuring capacitive means and of a magnitude indicative of the dielectric constant of the fluid; compensator empty container capacitive means, means including said compensator empty container capacitive means connected across a portion of said voltage source in a manner to provide a signal equal and opposite to the portion of the signal from said compensator capacitive means indicative of no fluid in the container; density responsive means; means variably connecting said density responsive means to said voltage source and controlling the potential of the portion of the voltage source across which said compensator capacitive means is connected; and indicating and rebalancing means connected to said four capacitive means and adding the four signals together and providing an indication of the weight of the fluid in the container, said indicating and rebalancing means being connected to and adjusting the variable connection of said compensator capacitive means across the portion of said voltage source and changing the signal from said compensator capacitive means upon the resultant signal not being zero such that the change of signal from said compensator capacitive means becomes equal to the change of signal from said measuring capacitive means due to change in quantity of the fluid and reducing the sum of the four signals to zero.

6. Fluid quantity measuring apparatus comprising in combination: a source of voltage; measuring capacitive means connected across a porion of said voltage source and inserted in a container of fluid and providing a signal indicative of the height and dielectric constant of the fluid; measuring empty container capacitive means connected across a portion of said voltage source and providing a signal equal and opposite to the portion of the signal from said measuring capacitive means indicative of no fluid in the container; compensator capacitive means variably connected across a portion of said voltage source and inserted in the container of fluid and providing a signal opposite to the signal from said measuring capacitive means and of a magnitude indicative of the dielectric constant of the fluid; phase reversing means, compensator empty container capacitive means, means including said compensator empty container capacitive means connected across a portion of said voltage source through said phase reversing means and providing a signal equal and opposite to the portion of the signal from said compensator capacitive means indicative of no fluid in the container; density responsive means; means variably connecting said density responsive means to said voltage source and controlling the potential of the portion of the voltage source across which said compensator capacitive means is connected; and indicating and rebalancing means connected to said four capacitive means and adding the four signals together and providing an indication of the weight of the fluid in the container, said indicating and rebalancing means being connected to and adjusting the variable connection of said compensator capacitive means across the portion of said voltage source and changing the signal from said compensator capacitive means upon the resultant signal not being zero such that the change of signal from said compensator capacitive means becomes equal to the change of signal from said measuring capacitive means due to change in quantity of the fluid and reducing the sum of the four signals to zero.

7. Fluid quantity measuring apparatus comprising in combination: a source of voltage; measuring capacitive means connected across a portion of said voltage source and inserted in a container of fluid and providing a signal indicative of the height and dielectric constant of the fluid; compensator capacitive means variably connected across a further portion of said voltage source and inserted in the container of fluid and providing a signal opposite to the signal from said measuring capacitive means and of a magnitude indicative of the dielectric constant of the fluid; compensator empty container capacitive means, means including said compensator empty container capacitive means variably connected across said further portion of said voltage source and providing a signal equal and opposite to the portion of the signal from said compensator capacitive means indicative of no fluid in the container; density responsive means; means variably connecting said density responsive means to said voltage source and controlling the potential of said further portion of the voltage source across which said compensator and said compensator empty container capacitive means are connected; and means adding the three signals together and providing an indication of the weight of the fluid in the container.

8. Fluid quantity measuring apparatus comprising in combination: a source of voltage; measuring capacitive means connected across a portion of said voltage source and inserted in a container of fluid and providing a signal indicative of the height and dielectric constant of the fluid; compensator capacitive means variably connected across a further portion of said voltage source and inserted in the container of fluid and providing a signal opposite to the signal from said measuring capacitive means and of a magnitude indicative of the dielectric constant of the fluid; phase reversing means, compensator empty container capacitive means variably connected across said further portion of said voltage source through said phase reversing means and providing a signal equal and opposite to the portion of the signal from said compensator capacitive means indicative of no fluid in the container; density responsive means; means variably connecting said density responsive means to said voltage source and controlling the potential of said further portion of the voltage source across which said compensator and said compensator empty container capacitive means are connected; and indicating and rebalancing means connected to said three capacitive means and adding the three signals together and providing an indication of the weight of the fluid in the container, said indicating and rebalancing means being connected to and adjusting the variable connection of said compensator and compensator empty container capacitive means across said further portion of said voltage source and changing the signal from said compensator capacitive means upon the resultant signal not being zero such that the change of signal from said compensator capacitive means becomes equal to the change of signal from said measuring capacitive means due to change in quantity of the fluid and reducing the sum of the three signals to zero.

References Cited in the file of this patent

UNITED STATES PATENTS

| | | |
|---|---|---|
| 2,541,743 | Brockman et al. | Feb. 13, 1951 |
| 2,581,085 | Edelman | Jan. 1, 1952 |

FOREIGN PATENTS

| | | |
|---|---|---|
| 114,980 | Sweden | Sept. 18, 1945 |

OTHER REFERENCES

YG 209 Fuel Quantity Indicating System, Aeronautical Div. of Minneapolis-Honeywell Reg. Co., September 1949.